(No Model.)

C. B. DUDLEY.
VALVE.

No. 422,924. Patented Mar. 11, 1890.

WITNESSES:
Henry Drury
Joshua Maklack, Jr

INVENTOR:
Charles B. Dudley
by his attorney
Francis T. Chambers

UNITED STATES PATENT OFFICE.

CHARLES B. DUDLEY, OF ALTOONA, PENNSYLVANIA.

VALVE.

SPECIFICATION forming part of Letters Patent No. 422,924, dated March 11, 1890.

Application filed November 13, 1888. Serial No. 290,695. (No model.)

*To all whom it may concern:*

Be it known that I, CHARLES B. DUDLEY, of Altoona, county of Blair, State of Pennsylvania, have invented a new and useful Improvement in Valves, of which the following is a true and exact description, reference being had to the accompanying drawings, which form a part of this specification.

My invention relates to the construction of valves, and more particularly to check-valves used in conduits through which gas or air is carried, and in which a check-valve is used to prevent a reflux action of the gas when the pressure in the conduit becomes greater on the side of the valve to which the gas normally passes than on the side from which it normally passes. It is important that these valves should be firmly seated and should completely close the conduit against the reflux passage of the gases even when the difference in pressures is very slight, and much difficulty has been found with ordinary check-valves in this respect. I have also found that my invention can be usefully applied, as hereinafter described, to regulator and other valves.

The object of my invention is to secure a firm tight seating of the valve even when the pressure holding it seated is very small, and I have discovered that this object can be attained by making the valve of leather or similar material, or by securing to the valve or its seat a washer of leather and combining with the leather valve or washer a reservoir adapted to contain glycerine and water or other liquid adapted to keep the leather soft and pliable, so that the soft saturated leather will always fit down tight upon the valve-seat or between it and the metallic valve.

Reference is now had to the drawings which illustrate my invention, and in which the four figures represent four different arrangements of valve and reservoir, each embodying my invention.

A in each case represents the pipe through which the gas is passing to the valve.

B is the valve-chamber, and C the pipe through which the gas issues after passing the valve.

Figure 1:
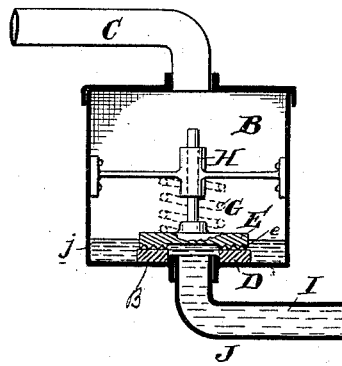
Figure 3:
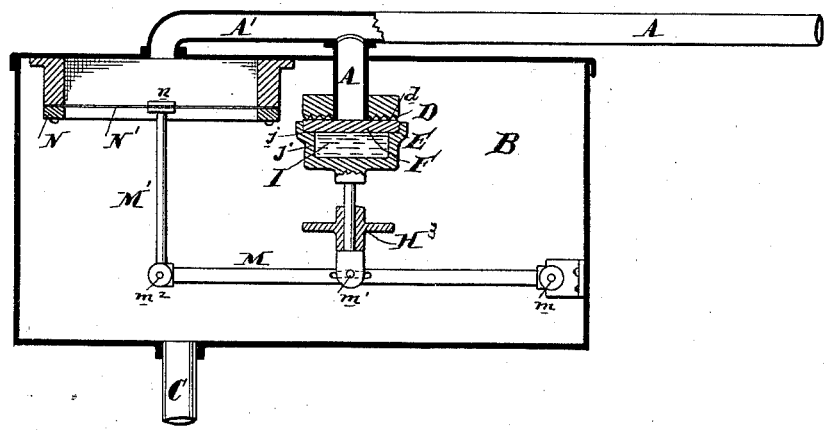
Figure 4:
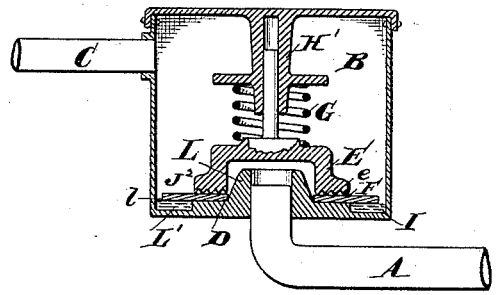

D is the valve-seat, E a metallic valve, and F a washer, of leather or similar material, serving itself as a valve or interposed between the valve and its seat, and either forming a part of the seat, as in Figures 1 and 4, or a part of the valve, as in Fig. 3.

G is a light spring arranged so that it will tend to hold the valve to its seat.

H H' H² are guides for the valve-stem, which may of course be of any convenient construction.

I indicates the fluid used to keep the washer soft and pliable, glycerine and water being preferred. This fluid is contained in a receptacle, which must be so constructed as to bring the washer F in contact with the fluid. In Fig. 1 this receptacle is made up of a U (marked J) in the pipe A, and the bottom of the valve-chamber and the fluid normally stands at about the level indicated by $j\,j$, the gas in passing bubbling through the fluid in the U.

Figure 2:
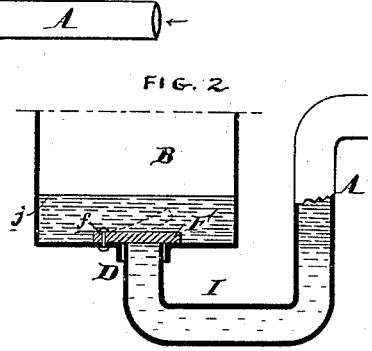

Fig. 2 is similar to Fig. 1, save in that the leather washer F here itself serves as a valve, being fastened at one edge $f$ and moving to and from its seat as the pressure changes.

In Fig. 3 the receptacle is formed by a cup-like hollow (marked J') formed in the valve, the washer here being attached to the valve and in contact with the upper surface $j$ of the fluid.

In Fig. 4 the receptacle (marked J²) is formed in the bottom of the valve-chamber by means of a nozzle L around the mouth of pipe A, the washer also surrounding this nozzle, and a chamber L' being formed below the seat on which the washer rests. This construction is of special advantage where for any reason it is desirable that the aeriform fluid should pass through the liquid. This arrangement, as shown in Fig. 4, is in its details of construction the joint invention of myself and one John D. Bowman, and forms the subject of another application for Letters Patent filed on the same date with this, and on which Letters Patent No. 405,250 issued June 18, 1889.

In Figs. 1 and 4 the valve is raised from its seat by the current of gas passing from pipe A to pipe C and returned to its seat whenever the pressure on its top, plus the power of the spring G, exceeds the pressure in pipe A.

In Fig. 3 a chamber is formed in the valve-chamber by the walls N and diaphragm N', and a branch A' of pipe A led into this chamber. A rod M' is secured to the diaphragm at $n$ and pivoted to a lever M at $m^2$, said lever being pivoted to the wall of casting B at m and having pivotally attached to it at m' the guide H³, which supports the valve. When the pressure in pipe A exceeds that in chamber B, the valve will leave its seat, and when the pressures are reversed the diaphragm N' will move up, drawing the lever M and guide H³ also upward and pressing valve E and washer F against the valve-seat D.

The general construction shown in Fig. 3 is that of a pressure-regulating valve, and by omitting the connecting-pipe A' and admitting atmospheric pressure to the upper side of diaphragm N the device will become a regulator-valve.

I of course make no claim to the construction shown in Fig. 4 as of my invention, save as said construction embodies the generic subject-matter hereinafter claimed.

Having now described my invention, what I claim as new, and desire to secure by Letters Patent, is—

1. The combination, with an aeriform-fluid conduit, of a valve and valve-seat located therein, one of which has a facing of leather or similar material, one side of the valve being exposed to the aeriform fluid passing to the point of use and the other side being exposed to the back-pressure of said aeriform fluid, and a body of liquid in contact with the leather facing, whereby the latter, being kept soft and pliable, will respond to slight back-pressure to effect a reliable closure of the valve.

2. The combination, with an aeriform-fluid conduit, of a valve and valve-seat located therein, one of which has a facing of leather or other similar material, and a body of liquid in contact with the reverse side of the facing only, so as to offer no obstruction to the free passage of the aeriform fluid.

CHAS. B. DUDLEY.

Witnesses:
J. CHESTER WILSON,
J. E. MOELLER.